(12) United States Patent
Ishii (10) Patent No.: US 11,003,954 B2
(45) Date of Patent: May 11, 2021

(54) INFORMATION PROCESSING DEVICE, INFORMATION PROCESSING METHOD, AND RECORDING MEDIUM

(71) Applicant: NEC CORPORATION, Tokyo (JP)

(72) Inventor: Masato Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 117 days.

(21) Appl. No.: 16/067,702

(22) PCT Filed: Jan. 17, 2017

(86) PCT No.: PCT/JP2017/001299
§ 371 (c)(1),
(2) Date: Jul. 2, 2018

(87) PCT Pub. No.: WO2017/126482
PCT Pub. Date: Jul. 27, 2017

(65) Prior Publication Data
US 2019/0012580 A1    Jan. 10, 2019

(30) Foreign Application Priority Data
Jan. 19, 2016    (JP) .............................. JP2016-007755

(51) Int. Cl.
*G06K 9/62*    (2006.01)
*G06N 3/08*    (2006.01)
*G06N 3/04*    (2006.01)

(52) U.S. Cl.
CPC ......... *G06K 9/6262* (2013.01); *G06K 9/6267* (2013.01); *G06N 3/04* (2013.01);
(Continued)

(58) Field of Classification Search
CPC .... G06K 9/6262; G06K 9/6267; G06N 3/084; G06N 3/0454; G06N 3/04; G06N 3/08
See application file for complete search history.

(56) References Cited

U.S. PATENT DOCUMENTS

2016/0379044 A1* 12/2016 Tang ................... G06K 9/00288
  382/118
2017/0133006 A1* 5/2017 Lee ......................... G10L 15/02

FOREIGN PATENT DOCUMENTS

| JP | 2015-095215 A | 5/2015 |
| JP | 2015-158582 A | 9/2015 |
| WO | 2015/078018 A1 | 6/2015 |

OTHER PUBLICATIONS

International Search Report for PCT/JP2017/001299 dated Apr. 4, 2017 [PCT/ISA/210].

(Continued)

*Primary Examiner* — Menatoallah Youssef (57) ABSTRACT

A neural network capturing a minute pattern variation useful for recognition while maintaining robustness against a pattern variation unrelated to recognition is learned. A preprocessing unit performs, on a set of patterns being to be learned and including a specific pattern variation, a plurality of preprocesses causing different degrees of the specific pattern variation. A network structure determination unit determines, for each of the plurality of preprocesses, a network structure of a neural network having robustness according to a degree of the specific pattern variation after the preprocess. A network learning unit learns, for each of the plurality of preprocesses, the neural network with the network structure associated with the preprocess using the set of patterns after the preprocess.

13 Claims, 10 Drawing Sheets

(52) U.S. Cl.
CPC ............. *G06N 3/0454* (2013.01); *G06N 3/08* (2013.01); *G06N 3/084* (2013.01)

(56) References Cited

OTHER PUBLICATIONS

Written Opinion for PCT/JP2017/001299 dated Apr. 4, 2017 [PCT/ISA/237].

* cited by examiner

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2017/001299, filed on Jan. 17, 2017, which claims priority from Japanese Patent Application No. 2016-007755, filed on Jan. 19, 2016, the disclosure of which is incorporated herein in its entirety by reference.

TECHNICAL FIELD

The present invention relates to an information processing device, an information processing method, and a recording medium. Particularly, the present invention relates to an information processing device, an information processing method, and a recording medium for learning a neural network.

BACKGROUND ART

A pattern recognition technique is a technique for estimating which class an input pattern belongs to. Specific examples of pattern recognition include object recognition which estimates an object appearing in an input image, voice recognition which estimates a speech content of an input voice, and the like.

Statistical machine learning is widely used as a pattern recognition technique. As statistical machine learning, a neural network in particular has been known in recent years as a learning method capable of recognition being robust against a pattern variation unrelated to recognition, because of development of a learning technique called deep learning.

In pattern recognition using a neural network, it is possible to perform recognition being robust against a pattern variation unrelated to recognition, but on the other hand, it is difficult to perform recognition capturing a minute pattern variation (minute characteristic difference) being useful for recognition. For example, in face authentication for identifying an individual from a face image, a pattern variation (a displacement of an image, and a difference of a position and a shape of a face resulting from a variation of facial expressions) unrelated to identification of an individual is larger than a characteristic difference (difference of positions and shapes of eyes and noses between individuals) useful for identification of an individual. Thus, when learning a neural network being robust against a pattern variation unrelated to recognition, it becomes difficult to capture a characteristic difference useful for identification of an individual.

Figure 5:
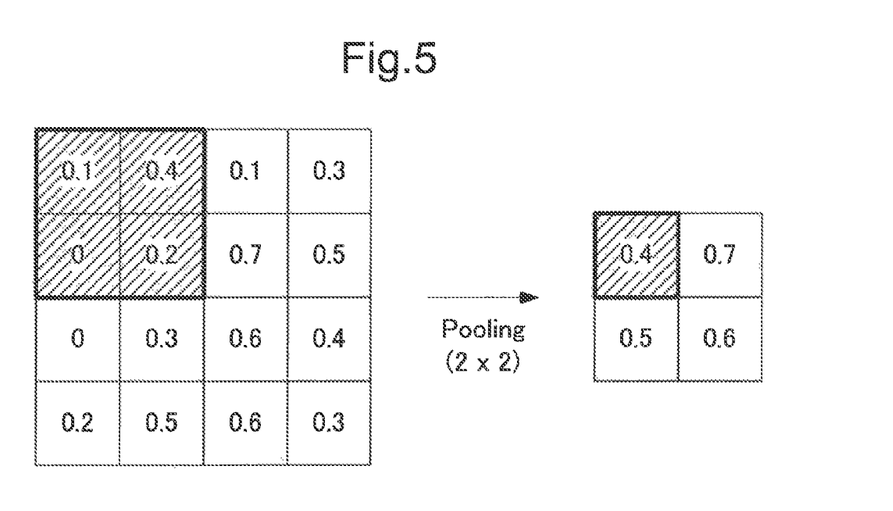
FIG. 5 is a diagram illustrating an example of pooling by a pooling layer.

Such a pattern variation unrelated to recognition is described with a positional variation (displacement) of an image as an example. Generally, in a neural network, a pooling layer, for example, as disclosed in PTL 1 is introduced in order to improve robustness against a positional variation. The pooling layer performs pooling which includes integrating pixel values for each local region and outputting a result. FIG. 5 is a diagram illustrating an example of pooling by a pooling layer. In FIG. 5, a rectangle represents a pixel, and a number in a rectangle represents a pixel value. In the example of FIG. 5, max pooling is performed as pooling. In the max pooling, a maximum value of pixel values in a local region (a region of 2×2 pixels in FIG. 5) is output as a pixel value after pooling. As a result of the pooling, substantially the same pixel value is output for a displacement whose size is equal to or less than a size of the local region. Therefore, it is possible to perform recognition being robust against a displacement by learning a neural network including a pooling layer.

Figure 6:
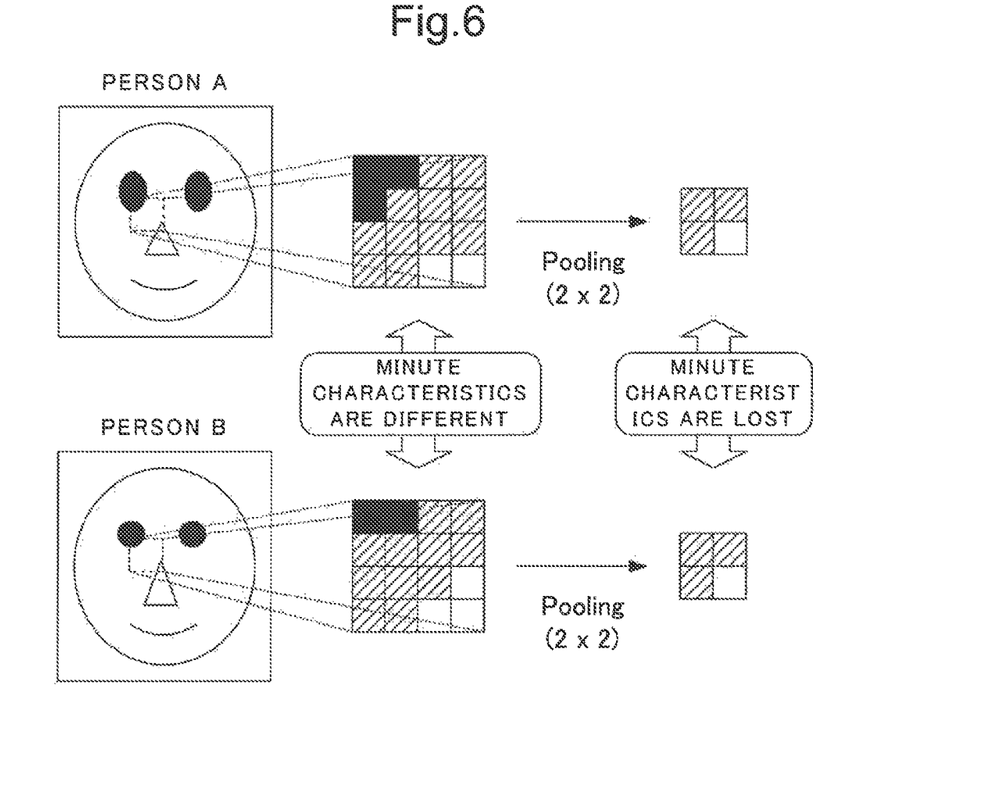
FIG. 6 is a diagram illustrating an example of pooling for face recognition.

FIG. 6 is a diagram illustrating an example of pooling for face recognition. Two images in FIG. 6 are face images of different persons. In these face images, minute characteristics in local regions are different, and it is therefore possible to distinguish the persons in the two images by capturing the minute characteristic difference. However, when a pooling layer is used, the minute characteristic difference is lost, and the same pixel value is output for each of the face images. Thus, while recognition being robust against a displacement can be performed, recognition capturing a minute characteristic difference cannot be performed.

CITATION LIST

Patent Literature

[PTL 1] Japanese Patent Application Laid-open Publication No. 2015-158582

SUMMARY OF INVENTION

Technical Problem

As described above, in a neural network having robustness as disclosed in PTL 1, there is a problem that it is difficult to capture a minute pattern variation useful for recognition. An object of the present invention is to provide an information processing device, an information processing method, and a recording medium which solve the problem mentioned above, and can learn a neural network capturing a minute pattern variation useful for recognition while maintaining robustness against a pattern variation unrelated to recognition.

Solution to Problem

An information processing device according to an exemplary aspect of the present invention includes: preprocessing means for performing, on a set of patterns being to be learned and including a specific pattern variation, a plurality of preprocesses causing different degrees of the specific pattern variation; network structure determination means for determining, for each of the plurality of preprocesses, a network structure of a neural network having robustness according to a degree of the specific pattern variation after the preprocess; and network learning means for learning, for each of the plurality of preprocesses, a neural network with a network structure associated with the preprocess using a set of patterns after the preprocess.

An information processing method according to an exemplary aspect of the present invention includes: performing, on a set of patterns being to be learned and including a specific pattern variation, a plurality of preprocesses causing different degrees of the specific pattern variation; determining, for each of the plurality of preprocesses, a network structure of a neural network having robustness according to a degree of the specific pattern variation after the preprocess; and learning, for each of the plurality of preprocesses, a neural network with a network structure associated with the preprocess using a set of patterns after the preprocess.

A computer readable storage medium records thereon a program causing a computer to perform a method including: performing, on a set of patterns being to be learned and including a specific pattern variation, a plurality of preprocesses causing different degrees of the specific pattern variation; determining, for each of the plurality of preprocesses, a network structure of a neural network having robustness according to a degree of the specific pattern variation after the preprocess; and learning, for each of the plurality of preprocesses, a neural network with a network structure associated with the preprocess using a set of patterns after the preprocess.

Advantageous Effects of Invention

An advantageous effect of the present invention is that it is possible to learn a neural network capturing a minute pattern variation useful for recognition while maintaining robustness against a pattern variation unrelated to recognition.

DESCRIPTION OF EMBODIMENTS

Example embodiments of the invention will be described in detail with reference to the drawings. In each drawing and each example embodiment described in the description, the same reference sign is given to similar components, and description thereof is suitably omitted.

In addition, a unidirectional arrow in a drawing simply indicates a direction of flow of data, and does not exclude bidirectionality.

First Example Embodiment

First, a configuration of a learning device 100 in a first example embodiment of the present invention is described.

Figure 2:
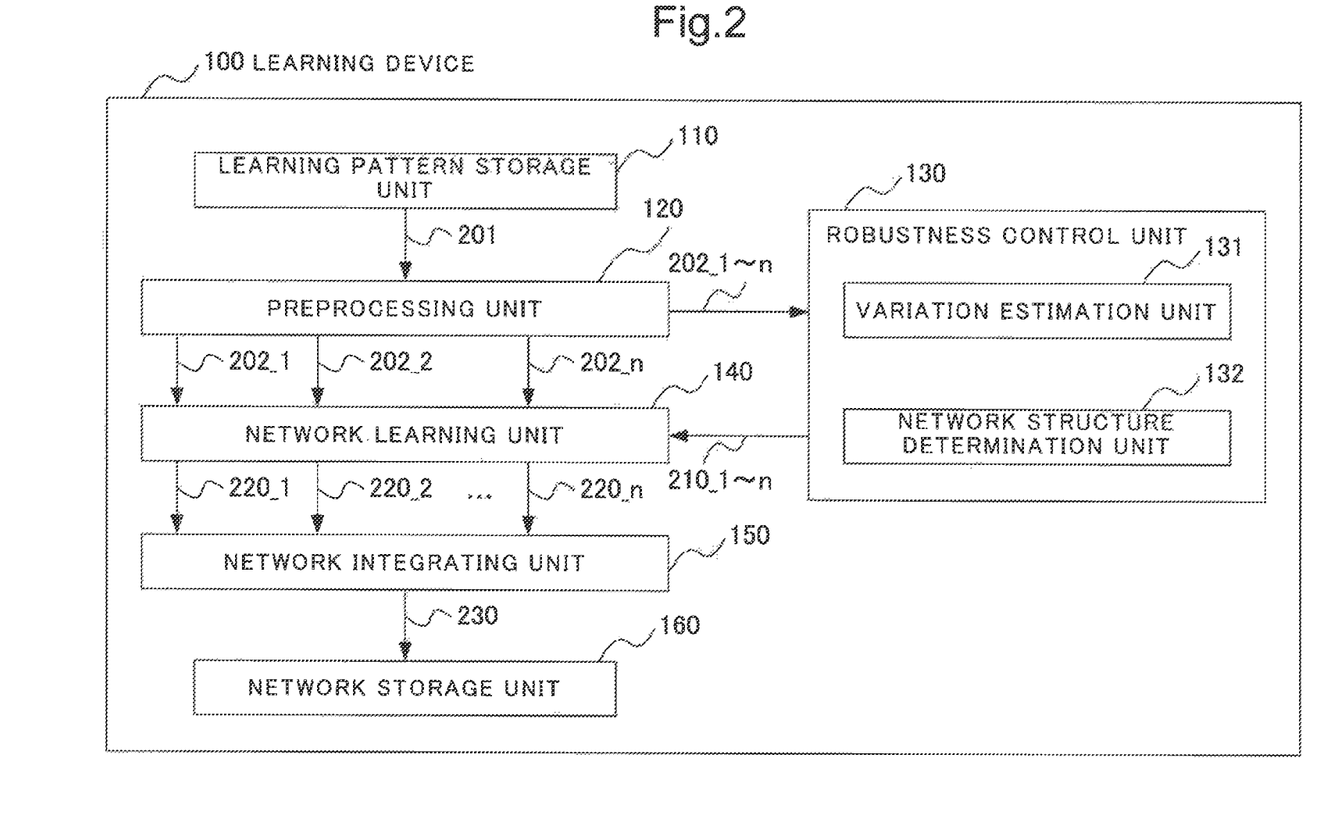
FIG. 2 is a block diagram illustrating a configuration of a learning device 100 in the first example embodiment of the present invention.

FIG. 2 is a block diagram illustrating a configuration of the learning device 100 in the first example embodiment of the present invention. The learning device 100 is one example embodiment of an information processing device of the present invention.

Referring to FIG. 2, the learning device 100 includes a learning pattern storage unit 110, a preprocessing unit 120, a robustness control unit 130, a network learning unit 140, a network integrating unit 150, and a network storage unit 160.

The learning pattern storage unit 110 stores an input set of patterns 201 (hereinafter, also described as a set of patterns) to be learned. The set of patterns 201 is a set of patterns to be learned in pattern recognition, such as an image or a voice. To each of the patterns 201, an identifier of an object to be recognized concerning the pattern is given, for example. Among the patterns 201 included in the set of patterns 201, a pattern variation unrelated to recognition exists in addition to a pattern variation related to the recognition. Herein, a pattern variation is a disparity (difference) among the patterns 201.

A pattern variation related to recognition (hereinafter, also described as a first pattern variation) is a pattern variation resulting from a difference among objects to be recognized (dependent on a difference among objects to be recognized), such as a pattern variation resulting from, for example, characteristics of faces or characteristics of voices of individuals. The pattern variation related to recognition may be a minute pattern variation useful for recognition. In pattern recognition using a neural network, a neural network needs to be learned in such a way that a pattern variation related to recognition can be identified by use of a set of patterns to be learned.

A pattern variation unrelated to recognition (hereinafter, also described as a second pattern variation) is a pattern variation resulting from a factor other than a difference among objects to be recognized (not dependent on a difference among objects to be recognized), such as a displacement of an image or a luminance change (a change of an illumination condition). Hereinafter, a pattern variation unrelated to recognition is also described as a specific pattern variation.

The preprocessing unit 120 performs, on each of the patterns 201 to be learned, predetermined plural kinds (n kinds (n is an integer equal to or more than 2)) of preprocesses to reduce a specific pattern variation. Effects of reducing the specific pattern variation by the plural kinds of preprocesses are different from each other. In other words, degrees of a specific pattern variation in respect sets of patterns 202 (202_1, ..., 202_n) after the plural kinds of preprocesses are different from each other.

The robustness control unit 130 includes a variation estimation unit 131 and a network structure determination unit 132. The variation estimation unit 131 estimates, for each of the plural kinds of preprocesses, a degree of a specific pattern variation in a set of patterns 202 after the preprocess. The network structure determination unit 132 determines, for each of the plural kinds of preprocesses, a network structure 210 (210_1, ..., 210_n) having robustness according to a degree of the specific pattern variation in the set of patterns 202 after the preprocess.

The network learning unit 140 learns, for each of the plural kinds of preprocesses, a neural network 220 (220_1, ..., 220_n) with the network structure 210 associated with the preprocess using the set of patterns 202 after the preprocess.

The network integrating unit 150 integrates the neural networks 220 learned for the plural kinds of preprocesses.

The network storage unit 160 stores the integrated neural network (hereinafter, also described as an integrated neural network 230).

Note that, the learning device 100 may be a computer including a central processing unit (CPU) and a storage medium storing a program, and operating by control based on the program.

Figure 3:
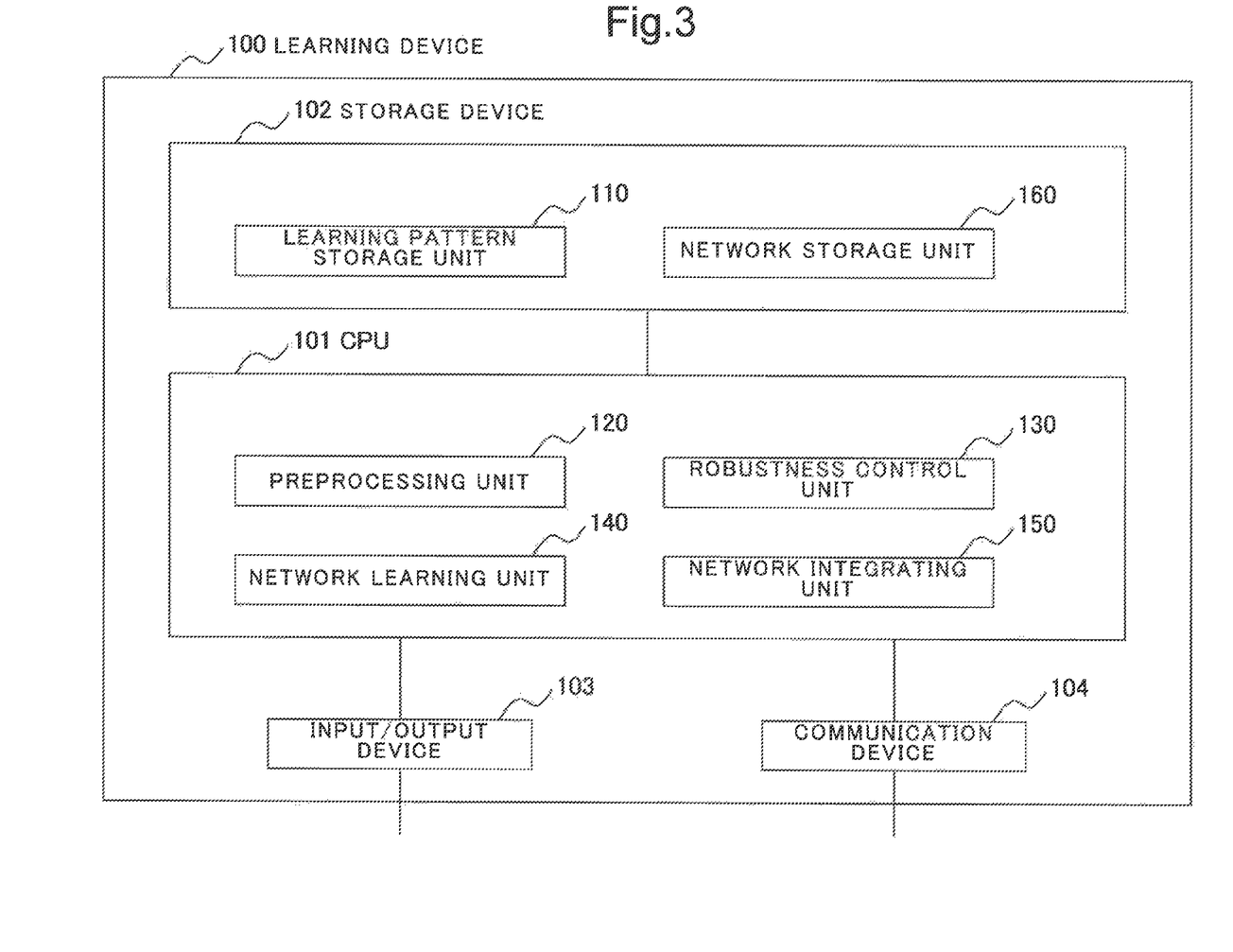
FIG. 3 is a block diagram illustrating a configuration of the learning device 100 implemented on a computer, in the first example embodiment of the present invention.

FIG. 3 is a block diagram illustrating a configuration of a learning device 100 implemented on a computer, in the first example embodiment of the present invention.

In this case, the learning device 100 includes a CPU 101, a storage device 102 (storage medium) such as a hard disk or a memory, an input/output device 103 such as a keyboard or a display, and a communication device 104 which communicates with other devices or the like. The CPU 101 executes a program for implementing the preprocessing unit 120, the robustness control unit 130, the network learning unit 140, and the network integrating unit 150. The storage device 102 stores data in the learning pattern storage unit 110 and the network storage unit 160. The input/output device 103 may input a set of the patterns 201 to be learned from a user, and output an integrated neural network 230 to the user. Moreover, the communication device 104 may receive the set of patterns 201 to be learned from other devices or the like, or transmit the integrated neural network 230 to the other devices or the like.

Furthermore, some or all of the respective components of the learning device 100 in FIG. 2 may be implemented on a general-purpose or dedicated circuitry or processor, or a combination of them. The circuitry or processor may be configured by a single chip, or configured by a plurality of chips connected via a bus. Alternatively, some or all of the respective components of the learning device 100 may be implemented on a combination of the above-described circuitry or the like and the program.

When some or all of the respective components are implemented on a plurality of information processing devices, circuitry, or the like, the plurality of information processing devices, circuitry, or the like may be arranged in a centralized manner, or arranged in a distributed manner. For example, the information processing devices, the circuitry, or the like may be implemented in a form such as a client and server system or a cloud computing system in which each of the information processing devices, the circuitry, or the like is connected via a communication network.

Figure 4:
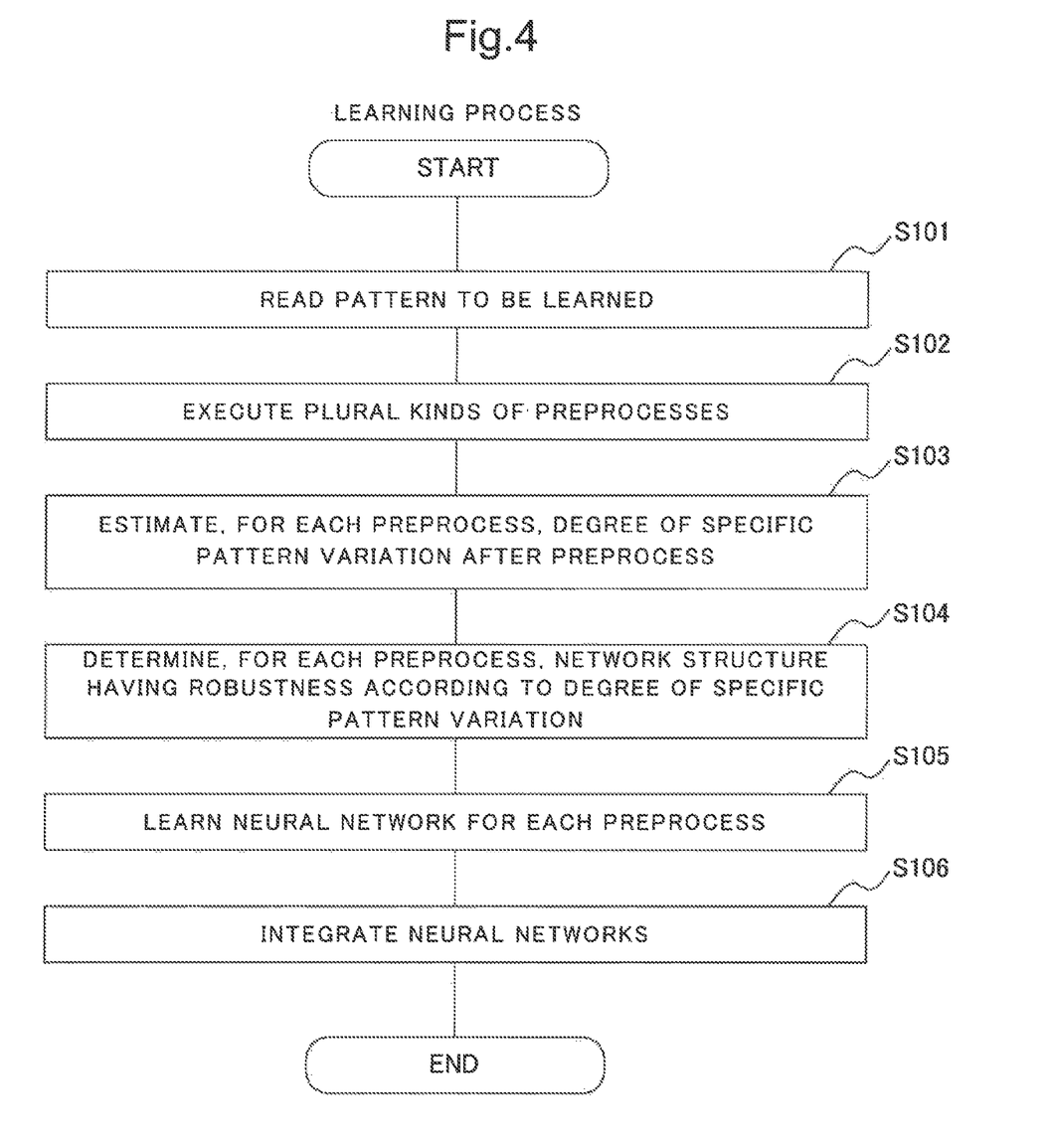
FIG. 4 is a flowchart illustrating a learning process of the learning device 100 in the first example embodiment of the present invention.

Next, the operation of the learning device 100 in the first example embodiment of the present invention is described. FIG. 4 is a flowchart illustrating a learning process of the learning device 100 in the first example embodiment of the present invention.

Herein, the operation is described as an example in the case where a pattern 201 to be learned is a face image, and a pattern variation (specific pattern variation) unrelated to recognition is a variation resulting from a displacement. A task of a neural network 220 to be learned is to obtain a face image as an input, and to output, for each identifier (ID) of an individual, a probability that the face image pertains to the individual (an identity probability of the ID).

It is assumed that a set of patterns 201 to be learned is input to the learning pattern storage unit 110 from the user, other devices, or the like, and stored therein in advance.

First, the preprocessing unit 120 reads the set of patterns 201 to be learned, from the learning pattern storage unit 110 (step S101).

Next, the preprocessing unit 120 performs plural kinds (n kinds) of preprocesses, for each of the read patterns 201 (step S102). The preprocessing unit 120 outputs, for each of the preprocesses, a set of patterns 202 (202_1, . . . , 202_n) after the preprocess to the robustness control unit 130 and the network learning unit 140.

Herein, as a preprocess, the preprocessing unit 120 performs, for example, alignment using a face characteristic point in the face image. For example, the preprocessing unit 120 performs alignment by adjusting (moving), to a position (average position) of a predetermined characteristic point (e.g., an eye, a mouth, a nose, or the like) in an average model of a face, a corresponding characteristic point of each pattern 201, using predetermined image conversion. In this case, when the number of characteristic points used for alignment is larger, and when the degree of freedom of image conversion used for alignment is higher, alignment is more finely performed, and the amount of displacement of the pattern 202 after the preprocess is therefore smaller. As plural kinds of preprocesses, the preprocessing unit 120 performs preprocesses different in the number of characteristic points and the degree of freedom of image conversion.

Next, the variation estimation unit 131 of the robustness control unit 130 estimates, for each of the plural kinds of preprocesses, a degree of a specific pattern variation in the set of patterns 202 (202_1, . . . , 202_n) after the preprocess (step S103).

Figure 7:
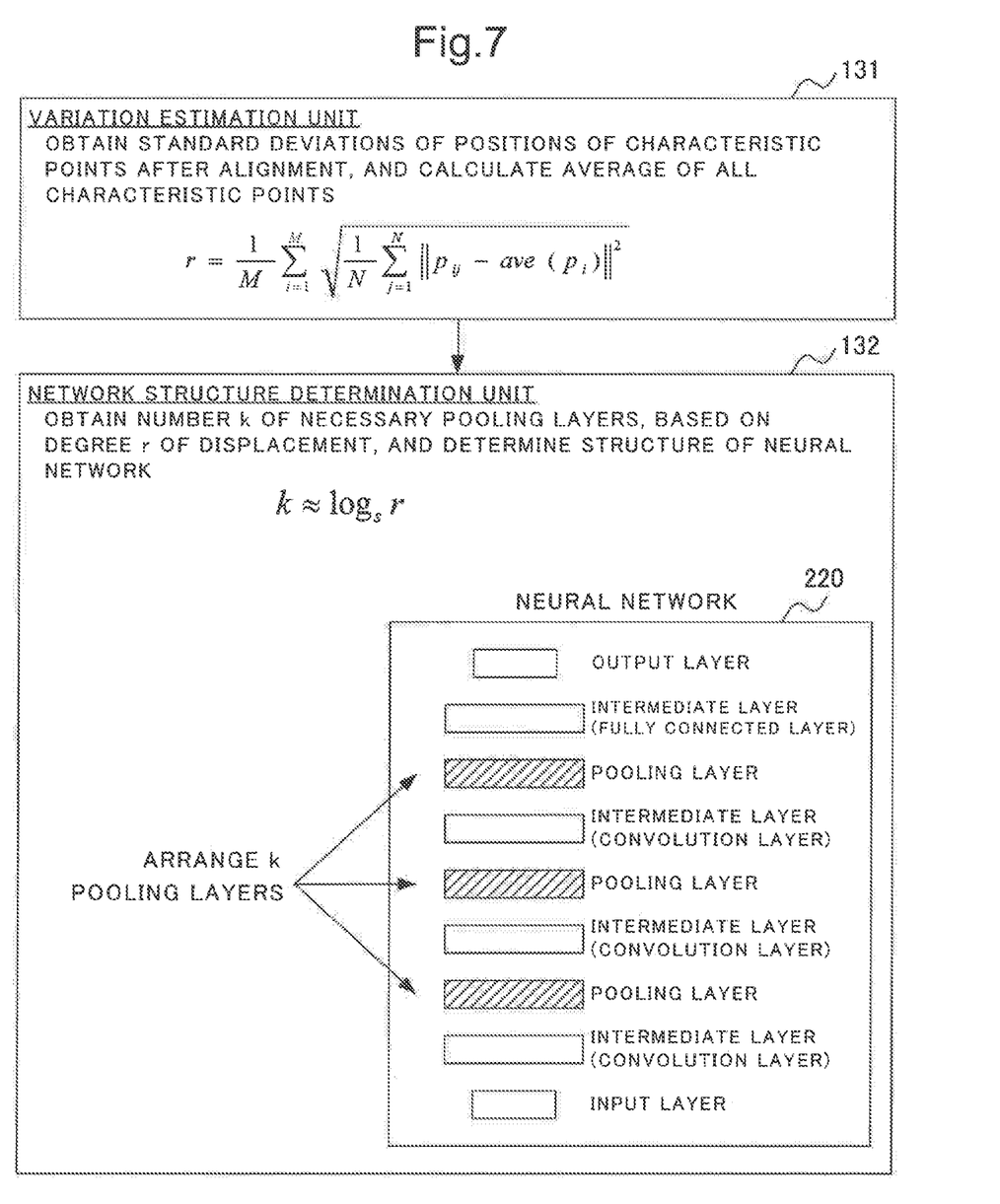
FIG. 7 is a diagram illustrating processing of a robustness control unit 130 in the first example embodiment of the present invention.

FIG. 7 is a diagram illustrating processing of the robustness control unit 130 in the first example embodiment of the present invention.

Herein, the variation estimation unit 131 calculates, as a degree of a specific pattern variation, a degree of a displacement amount of the pattern 202 after the preprocess. The degree of the displacement amount can be estimated by an average of standard deviations of positions of the respective characteristic points after alignment over all characteristic points. When the number of characteristic points is M (M is an integer of 1 or more), the number of patterns to be learned is N (N is an integer of 1 or more), and the position of a characteristic point after alignment is pij (i=1, . . . , M, and j=1, . . . , N), an average of standard deviations of positions of face characteristic points after alignment is calculated by Equation 1.

$$r = \frac{1}{M}\sum_{i=1}^{M} \sqrt{\frac{1}{N}\sum_{j=1}^{N} \|p_{ij} - ave(p_i)\|^2} \qquad \text{[Equation 1]}$$

In Equation 1, ave(pi) is an average position of an i-th characteristic point. In addition, pij and ave(pi) are represented by, for example, two-dimensional coordinates. In this case, ∥pij−ave(pi)∥ is a distance between two-dimensional coordinates pij and ave(pi). For example, positions of pixels are used as two-dimensional coordinates.

Next, the network structure determination unit 132 determines, for each of the plural kinds of preprocesses, a network structure 210 (210_1, . . . , 210_n) having robustness according to the estimated degree of the specific pattern variation (step S104). The network structure determination unit 132 outputs the determined network structure 210 to the network learning unit 140.

Herein, the network structure determination unit 132 adjusts robustness against the displacement of the neural network 220 by the number of pooling layers, as illustrated in FIG. 7. As pooling in the pooling layers, for example, max pooling as illustrated in FIG. 5 is uniformly applied to the whole image. When a size of one side of a local region in the pooling is s, substantially the same pixel value is output as a result of the pooling even though a pattern has a displacement whose size is within s pixels. By introducing k such pooling layers, it is possible to configure a network robust against a displacement whose size is within s^k (a k-th power of s) pixels. Generally, s=2 is used as the size s, as illustrated in FIG. 5. The network structure determination unit 132 determines the number k of pooling layers by Equation 2, using an estimated value r of a degree of a specific pattern variation (a degree of a displacement amount).

$$k \approx \log_s r \qquad \text{[Equation 2]}$$

The network structure determination unit 132 further determines arrangement positions of the determined number k of pooling layers. For example, as illustrated in FIG. 7, the network structure determination unit 132 arranges pooling layers in such a way that a set of an intermediate layer (convolution layer) and a pooling layer is arranged k times from a side close to an input layer. Further, the network structure determination unit 132 arranges an intermediate layer (fully connected layer) between the sets and an output layer.

Note that, without being limited to the arrangement positions in FIG. 7, the network structure determination unit 132 may arrange a pooling layer and an intermediate layer at other positions as long as the determined number k of pooling layers can be arranged.

Figure 8:
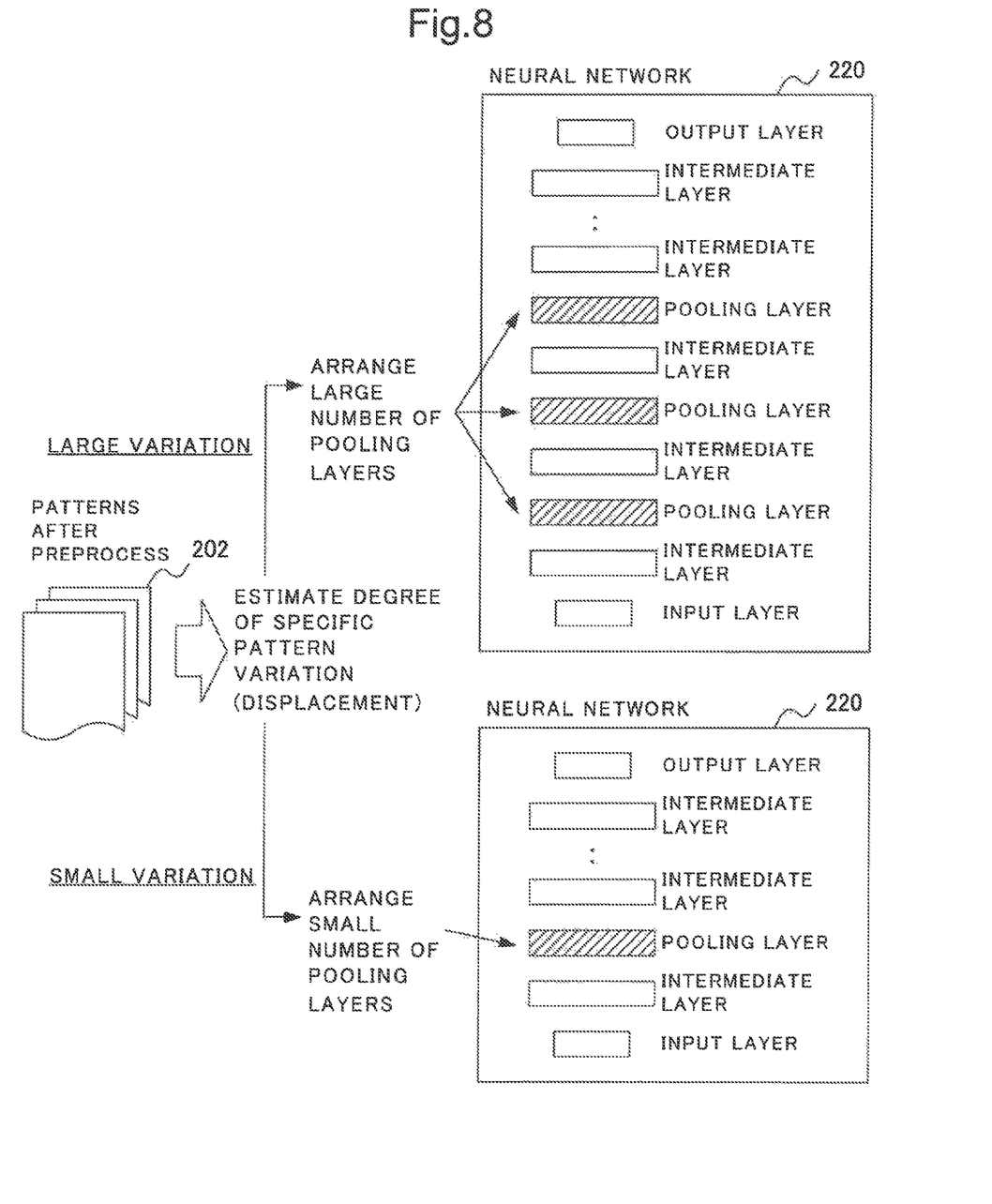
FIG. 8 is a diagram illustrating a difference of network structures 210 of neural networks 220 according to a degree of a specific pattern variation, in the first example embodiment of the present invention.

FIG. 8 is a diagram illustrating a difference of the network structures 210 of neural networks 220 according to a degree of a specific pattern variation, in the first example embodiment of the present invention.

By the processing in step S104, for a preprocess having a large estimated displacement amount, a network structure 210 in which a large number of pooling layers are arranged is generated in such a way that robustness against a displacement is higher, as illustrated in FIG. 8. In contrast, for a preprocess having a small estimated displacement amount, a network structure 210 in which a small number of pooling layers are arranged is generated, since robustness against a displacement is allowed to be low.

Note that, although max pooling is used as pooling in the first example embodiment of the present invention, pooling is not limited thereto, and other generally used poolings (average pooling, Lp pooling, and the like) may be used as pooling. Since max pooling performs nonlinear processing, a tendency of learning considerably changes according to the number of pooling layers. Therefore, using max pooling as pooling improves recognition performance in the integrated neural network 230 more easily, than using other poolings.

Furthermore, although uniform pooling is performed in the whole image in the first example embodiment of the present invention, pooling differing in size depending on a position on an image may be performed when an estimated degree of a specific pattern variation is not uniform in the whole image. In this case, for example, the size s of one side of a local region is determined to be larger for a position where a degree of a specific pattern variation is high than for a position where a degree of a specific pattern variation is low.

Next, the network learning unit 140 learns, for each of the plural kinds of preprocesses, a neural network 220 (220_1, ..., 220_n) with the network structure 210 input from the robustness control unit 130 (step S105). Herein, using a set of patterns 202 after the preprocess input from the preprocessing unit 120, the network learning unit 140 learns the neural network 220 with the network structure 210 associated with the preprocess. The network learning unit 140 learns the neural network 220 by use of, for example, backpropagation which is a learning method of a general neural network. The network learning unit 140 outputs the learned neural network 220 to the network integrating unit 150.

Next, the network integrating unit 150 integrates the neural networks 220 (220_1, ..., 220_n) for the plural kinds of preprocesses input from the network learning unit 140 (step S106). Herein, the network integrating unit 150 integrates the neural networks 220 in such a way that a recognition result in which recognition results by the neural networks 220 associated with the respective preprocesses are integrated is output. The network integrating unit 150 saves an integrated neural network 230 obtained by the integration in the network storage unit 160. Note that, the network integrating unit 150 may output the integrated neural network 230 to the user, other devices, or the like.

Figure 9:
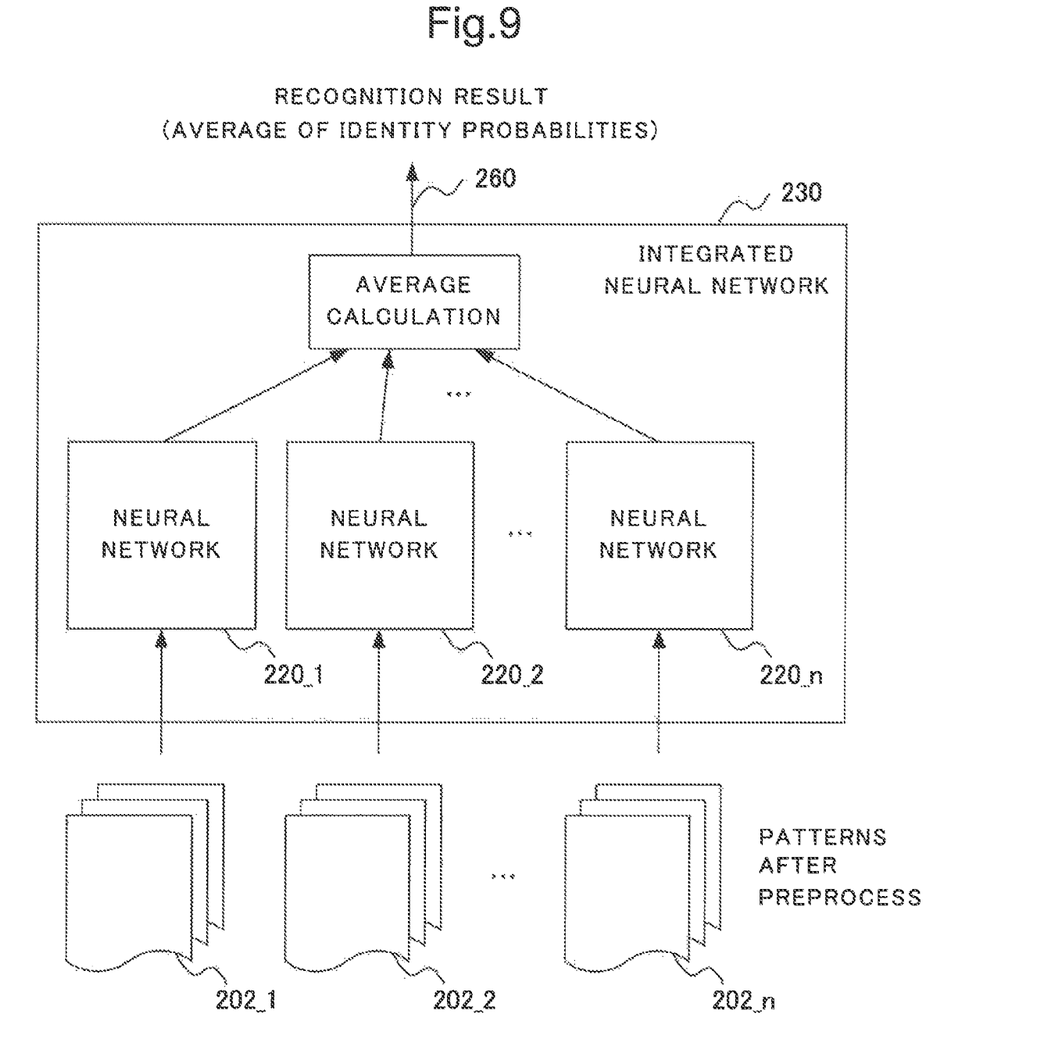
FIG. 9 is a diagram illustrating an example of an integrated neural network 230 in the first example embodiment of the present invention.

FIG. 9 is a diagram illustrating an example of the integrated neural network 230 in the first example embodiment of the present invention.

For example, the network integrating unit 150 generates, as the integrated neural network 230, the neural networks 220_1, ..., and 220_n, and an average calculation process for calculating an average of identity probabilities obtained from the neural networks, as illustrated in FIG. 9.

With this, the operation according to the first example embodiment of the present invention is completed.

Note that, in the case described as an example in the first example embodiment of the present invention, a pattern variation (specific pattern variation) unrelated to recognition is a variation resulting from a displacement. However, without being limited thereto, a pattern variation unrelated to recognition may be a variation resulting from a factor other than a displacement.

For example, a pattern variation (specific pattern variation) unrelated to recognition may be a variation resulting from a luminance change (a change of an illumination condition) of an image. In this case, the preprocessing unit 120 performs normalization of luminance (processing of adjusting brightness of an image), for example, in a different way as a plural kinds of preprocesses to reduce the specific pattern variation. The variation estimation unit 131 estimates a degree of a difference of luminance after the preprocess as a degree of a specific pattern variation in a set of patterns 202 after the preprocess. The network structure determination unit 132 adjusts the robustness of the neural network 220 against the difference of luminance by the number of layers for normalizing a hidden value in a local region (local response normalization (LRN) layers).

Alternatively, a pattern variation (specific pattern variation) unrelated to recognition may be a variation resulting from both a displacement and a luminance change. In this case, it is possible to simultaneously control robustness against both the displacement and the luminance change by adjusting the numbers of both pooling layers and LRN layers.

Furthermore, in the first example embodiment of the present invention, the variation estimation unit 131 estimates a degree of a specific pattern variation in a set of patterns 202 after the preprocess. However, the present invention is not limited thereto, and the variation estimation unit 131 may be omitted when the preprocessing unit 120 can determine a degree of the specific pattern variation in the set of patterns 202 after the preprocess. In this case, the network structure determination unit 132 determines a network structure 210 according to the degree of the specific pattern variation determined by the preprocessing unit 120.

Moreover, in the case described as an example in the first example embodiment of the present invention, the pattern 201 to be learned is a pattern of an image. However, without being limited thereto, the pattern 201 may be a pattern of a voice as long as a neural network can be learned for a pattern 201 to be learned.

Next, a characteristic configuration according to the first example embodiment of the present invention is described.

Figure 1:
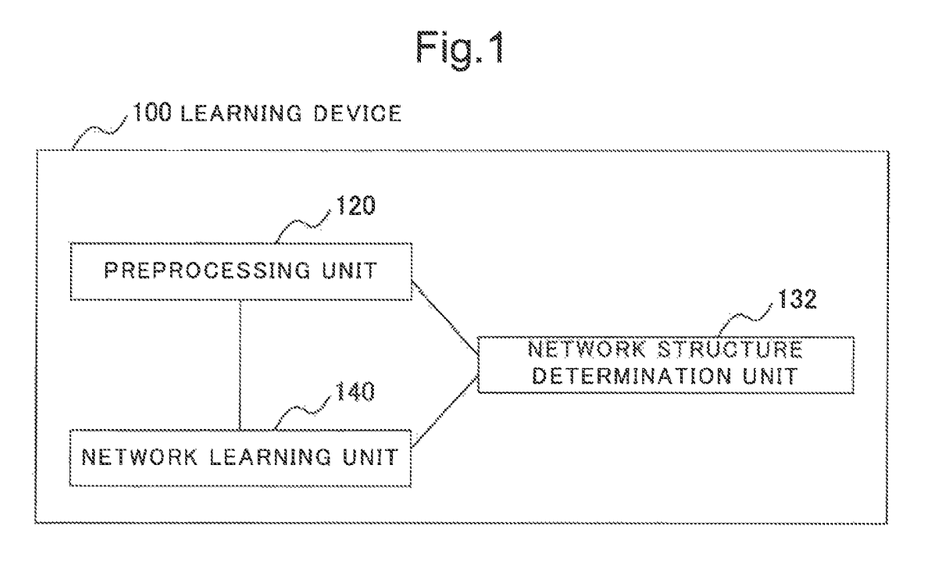
FIG. 1 is a block diagram illustrating a characteristic configuration of a first example embodiment of the present invention.

FIG. 1 is a block diagram illustrating the characteristic configuration according to the first example embodiment of the present invention. Referring to FIG. 1, a learning device 100 (information processing device) includes a preprocessing unit 120 (preprocessing means), a network structure determination unit 132 (network structure determination means), and a network learning unit 140 (network learning means).

The preprocessing unit 120 performs, on a set of patterns 201 being to be learned and including a specific pattern variation, a plurality of preprocesses causing different degrees of the specific pattern variation. The network structure determination unit 132 determines, for each of the plurality of preprocesses, a network structure 210 of a neural network 220 having robustness according to a degree of the specific pattern variation after the preprocess. The network learning unit 140 learns, for each of the plurality of preprocesses, the neural network 220 with the network structure 210 associated with the preprocess using the set of patterns 202 after the preprocess.

Next, an advantageous effect of the first example embodiment of the present invention is described.

According to the first example embodiment of the present invention, it is possible to learn a neural network capturing a minute pattern variation useful for recognition while maintaining robustness against a pattern variation unrelated to recognition. The reason is that the learning device 100 performs a plurality of preprocesses on a set of patterns 201 including a specific pattern variation, and learns, for each preprocess, a neural network 220 having robustness according to the degree of the specific pattern variation after the preprocess. Thus, for a preprocess in which the specific pattern variation unrelated to recognition is large, a neural network 220 having high robustness against the specific pattern variation is learned, and recognition robust against the specific pattern variation is performed. On the other hand, for a preprocess in which the specific pattern variation is small, a neural network 220 having low robustness against the specific pattern variation is learned, and recognition capturing a minute characteristic difference useful for recognition is performed. Thus, because the learned plurality of neural networks 220 are considerably different from each other in a tendency of recognition, performance of recognition can be significantly improved by integrating the neural networks 220 as is generally known as ensemble learning. In other words, by integrating the learned plurality of neural networks 220, it is possible to obtain an integrated neural network 230 capturing a minute pattern variation useful for recognition while maintaining robustness against a pattern variation unrelated to recognition.

Second Example Embodiment

Next, a second example embodiment of the present invention is described.

In the second example embodiment of the present invention, pattern recognition for a pattern 251 to be recognized is performed by use of an integrated neural network 230.

First, a configuration of a learning device 100 in the second example embodiment of the present invention is described.

Figure 10:
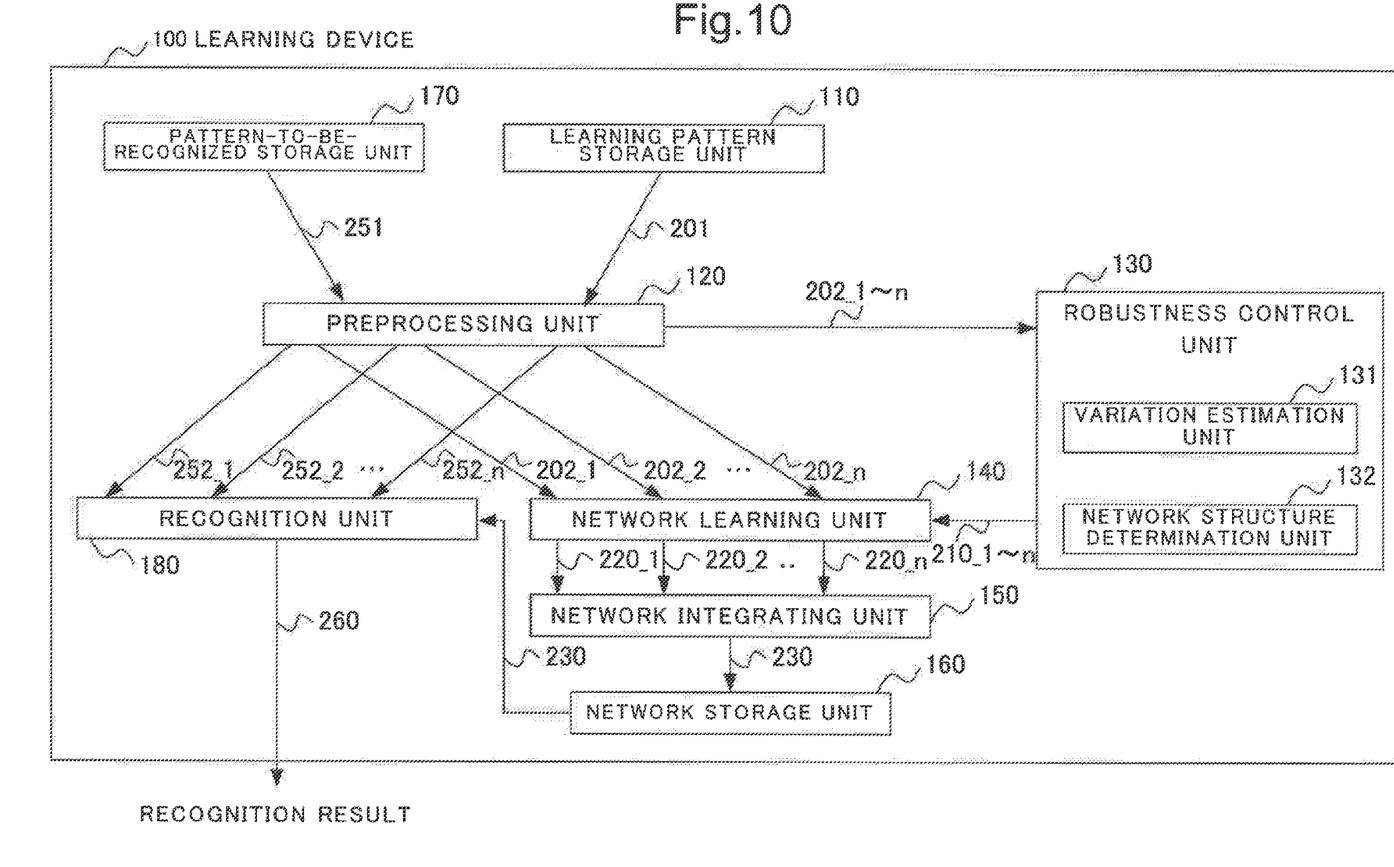
FIG. 10 is a block diagram illustrating a configuration of a learning device 100 in a second example embodiment of the present invention.

FIG. 10 is a block diagram illustrating the configuration of the learning device 100 in the second example embodiment of the present invention. The learning device 100 according to the second example embodiment of the present invention includes a pattern-to-be-recognized storage unit 170 and a recognition unit 180, in addition to the components of the learning device 100 according to the first example embodiment of the present invention (FIG. 2).

The pattern-to-be-recognized storage unit 170 stores the pattern 251 to be recognized. The recognition unit 180 performs pattern recognition for the pattern 251 to be recognized, by use of the integrated neural network 230.

Next, the operation of the learning device 100 in the second example embodiment of the present invention is described.

Figure 11:
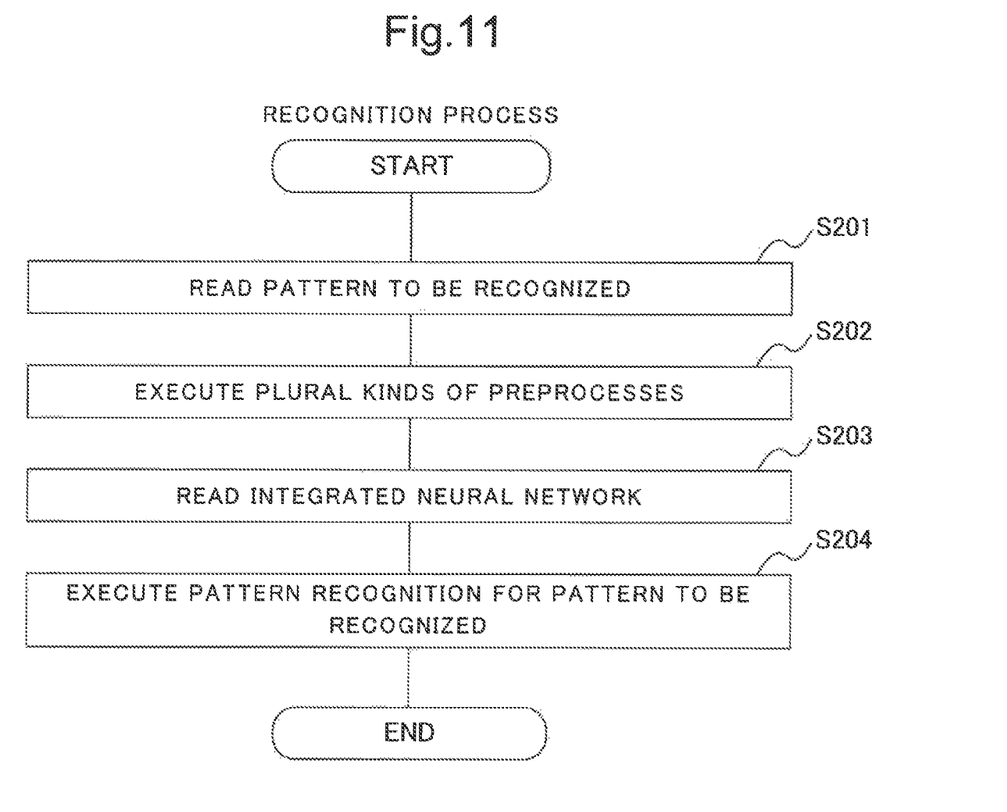
FIG. 11 is a flowchart illustrating a recognition process of the learning device 100 in the second example embodiment of the present invention.

FIG. 11 is a flowchart illustrating a recognition process of the learning device 100 in the second example embodiment of the present invention. The recognition process is performed after the integrated neural network 230 is generated by the above-described learning process (steps S101 to S106).

Herein, it is assumed that the integrated neural network 230 as in FIG. 9 is saved in the network storage unit 160.

First, the preprocessing unit 120 reads a pattern 251 to be recognized, from the pattern-to-be-recognized storage unit 170 (step S201).

Next, the preprocessing unit 120 performs plural kinds (n kinds) of preprocesses, for the read pattern 251 (step S202). The preprocessing unit 120 outputs patterns 252 (252_1, . . . , 252_n) after the preprocess for each of the preprocesses to the recognition unit 180.

The recognition unit 180 reads the integrated neural network 230 from the network storage unit 160 (step S203). For example, the recognition unit 180 reads the integrated neural network 230 illustrated in FIG. 9.

The recognition unit 180 executes pattern recognition for the pattern 251 to be recognized, by use of the read integrated neural network 230 (step S204). Herein, for the pattern 252 (252_1, . . . , 252_n) after processing of each of the plural kinds of preprocesses input from the preprocessing unit 120, the recognition unit 180 executes pattern recognition by use of an associated neural network 220 (220_1, . . . , 220_n). Then, the recognition unit 180 integrates recognition results by the respective neural networks 220 (220_1, . . . , 220_n) in accordance with the integrated neural network 230. For example, the recognition unit 180 calculates an average of identity probabilities output from the respective neural networks 220 (220_1, . . . , 220_n) in accordance with the integrated neural network 230 in FIG. 9.

The recognition unit 180 outputs a result of the pattern recognition (recognition result 260) to the user, other devices, or the like (step S204). For example, the recognition unit 180 outputs the average of the identity probabilities as the recognition result 260.

With this, the operation according to the second example embodiment of the present invention is completed.

Next, an advantageous effect of the second example embodiment of the present invention is described.

According to the second example embodiment of the present invention, it is possible to obtain high recognition performance even when a pattern variation unrelated to recognition exists. The reason is that the learning device 100 recognizes a pattern 251 to be recognized, by use of an integrated neural network 230 learned in such a way as to be able to capture a minute pattern variation useful for recognition while maintaining robustness against a pattern variation unrelated to recognition.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

An information processing device including:

preprocessing means for performing, on a set of patterns being to be learned and including a specific pattern variation, a plurality of preprocesses causing different degrees of the specific pattern variation;

network structure determination means for determining, for each of the plurality of preprocesses, a network structure of a neural network having robustness according to a degree of the specific pattern variation after the preprocess; and network learning means for learning, for each of the plurality of preprocesses, a neural network with a network structure associated with the preprocess using a set of patterns after the preprocess.

(Supplementary Note 2)

The information processing device according to supplementary note 1, further including:

variation estimation means for estimating, for each of the plurality of preprocesses, a degree of the specific pattern variation in a set of patterns after the preprocess.

(Supplementary Note 3)

The information processing device according to supplementary note 1 or 2, wherein a pattern included in the set of patterns is an image, and the specific pattern variation is a displacement of an image.

(Supplementary Note 4)

The information processing device according to supplementary note 1 or 2, wherein a pattern included in the set of patterns is an image, and the specific pattern variation is a luminance change of an image.

(Supplementary Note 5)

The information processing device according to any one of supplementary notes 1 to 4, further including:

recognition means for performing recognition of a pattern to be recognized, by recognizing a pattern after processing of each of the plurality of preprocesses for the pattern to be recognized using a neural network learned for the preprocess.

(Supplementary Note 6)

An information processing method including:

performing, on a set of patterns being to be learned and including a specific pattern variation, a plurality of preprocesses causing different degrees of the specific pattern variation;

determining, for each of the plurality of preprocesses, a network structure of a neural network having robustness according to a degree of the specific pattern variation after the preprocess; and learning, for each of the plurality of preprocesses, a neural network with a network structure associated with the preprocess using a set of patterns after the preprocess.

(Supplementary Note 7)

The information processing method according to supplementary note 6, further including:

estimating, for each of the plurality of preprocesses, a degree of the specific pattern variation in a set of patterns after the preprocess.

(Supplementary Note 8)

The information processing method according to supplementary note 6 or 7, wherein a pattern included in the set of patterns is an image, and the specific pattern variation is a displacement of an image.

(Supplementary Note 9)

The information processing method according to any one of supplementary notes 6 to 8, further including:

performing recognition of a pattern to be recognized, by recognizing a pattern after processing of each of the plurality of preprocesses for the pattern to be recognized using a neural network learned for the preprocess.

(Supplementary Note 10)

A computer readable storage medium recording thereon a program causing a computer to perform a method including:

performing, on a set of patterns being to be learned and including a specific pattern variation, a plurality of preprocesses causing different degrees of the specific pattern variation;

determining, for each of the plurality of preprocesses, a network structure of a neural network having robustness according to a degree of the specific pattern variation after the preprocess; and learning, for each of the plurality of preprocesses, a neural network with a network structure associated with the preprocess using a set of patterns after the preprocess.

(Supplementary Note 11)

The computer readable storage medium recording thereon the program according to supplementary note 10, causing the computer to perform the method further including:

estimating, for each of the plurality of preprocesses, a degree of the specific pattern variation in a set of patterns after the preprocess.

(Supplementary Note 12)

The computer readable storage medium recording thereon the program according to supplementary note 10 or 11, causing the computer to perform the method, wherein a pattern included in the set of patterns is an image, and the specific pattern variation is a displacement of an image.

(Supplementary Note 13)

The computer readable storage medium recording thereon the program according to any one of supplementary notes 10 to 12, causing the computer to perform the method further including:

performing recognition of a pattern to be recognized, by recognizing a pattern after processing of each of the plurality of preprocesses for the pattern to be recognized using a neural network learned for the preprocess.

This application is based upon and claims the benefit of priority from Japanese patent application No. 2016-007755, filed on Jan. 19, 2016, the disclosure of which is incorporated herein in its entirety by reference.

REFERENCE SIGNS LIST

100 Learning device
101 CPU
102 Storage device

103 Input/output device
104 Communication device
110 Learning pattern storage unit
120 Preprocessing unit
130 Robustness control unit
131 Variation estimation unit
132 Network structure determination unit
140 Network learning unit
150 Network integrating unit
160 Network storage unit
170 Pattern-to-be-recognized storage unit
180 Recognition unit
201 Pattern
202 Pattern
210 Network structure
220 Neural network
230 Integrated neural network
251 Pattern
252 Pattern
260 Recognition result

The invention claimed is:

1. An information processing device comprising:
a memory storing instructions; and
one or more processors configured to execute the instructions to:
perform, on a set of patterns being to be learned and including a specific pattern variation, a plurality of preprocesses causing different degrees of the specific pattern variation;
determine, for each of the plurality of preprocesses, a number of pooling layers according to a degree of the specific pattern variation after the preprocess, and determine a network structure in which the determined number of pooling layers are arranged as a network structure of a neural network having robustness according to the degree of the specific pattern variation after the preprocess; and
learn, for each of the plurality of preprocesses, a neural network with a network structure associated with the preprocess using a set of patterns after the preprocess.

2. The information processing device according to claim 1, wherein the one or more processors configured to further execute the instructions to:
estimate, for each of the plurality of preprocesses, a degree of the specific pattern variation in a set of patterns after the preprocess.

3. The information processing device according to claim 1, wherein a pattern included in the set of patterns is an image, and the specific pattern variation is a displacement of an image.

4. The information processing device according to claim 1, wherein a pattern included in the set of patterns is an image, and the specific pattern variation is a luminance change of an image.

5. The information processing device according to claim 1, wherein the one or more processors configured to further execute the instructions to:
perform recognition of a pattern to be recognized, by recognizing a pattern after processing of each of the plurality of preprocesses for the pattern to be recognized using a neural network learned for the preprocess.

6. An information processing method comprising:
performing, on a set of patterns being to be learned and including a specific pattern variation, a plurality of preprocesses causing different degrees of the specific pattern variation;
determining, for each of the plurality of preprocesses, a number of pooling layers according to a degree of the specific pattern variation after the preprocess, and determine a network structure in which the determined number of pooling layers are arranged as a network structure of a neural network having robustness according to the degree of the specific pattern variation after the preprocess; and
learning, for each of the plurality of preprocesses, a neural network with a network structure associated with the preprocess using a set of patterns after the preprocess.

7. The information processing method according to claim 6, further comprising:
estimating, for each of the plurality of preprocesses, a degree of the specific pattern variation in a set of patterns after the preprocess.

8. The information processing method according to claim 6, wherein a pattern included in the set of patterns is an image, and the specific pattern variation is a displacement of an image.

9. The information processing method according to claim 6, further comprising:
performing recognition of a pattern to be recognized, by recognizing a pattern after processing of each of the plurality of preprocesses for the pattern to be recognized using a neural network learned for the preprocess.

10. A non-transitory computer readable storage medium recording thereon a program causing a computer to perform a method comprising:
performing, on a set of patterns being to be learned and including a specific pattern variation, a plurality of preprocesses causing different degrees of the specific pattern variation;
determining, for each of the plurality of preprocesses, a number of pooling layers according to a degree of the specific pattern variation after the preprocess, and determine a network structure in which the determined number of pooling layers are arranged as a network structure of a neural network having robustness according to the degree of the specific pattern variation after the preprocess; and
learning, for each of the plurality of preprocesses, a neural network with a network structure associated with the preprocess using a set of patterns after the preprocess.

11. The non-transitory computer readable storage medium recording thereon the program according to claim 10, causing the computer to perform the method further comprising:
estimating, for each of the plurality of preprocesses, a degree of the specific pattern variation in a set of patterns after the preprocess.

12. The non-transitory computer readable storage medium recording thereon the program according to claim 10, wherein a pattern included in the set of patterns is an image, and the specific pattern variation is a displacement of an image.

13. The non-transitory computer readable storage medium recording thereon the program according to claim 10, causing the computer to perform the method further comprising:
performing recognition of a pattern to be recognized, by recognizing a pattern after processing of each of the plurality of preprocesses for the pattern to be recognized using a neural network learned for the preprocess.

* * * * *